United States Patent
Kanno et al.

(10) Patent No.: US 8,584,089 B2
(45) Date of Patent: Nov. 12, 2013

(54) VIRTUAL COMPUTER SYSTEM, TEST METHOD, AND RECORDING MEDIUM

(75) Inventors: Masaki Kanno, Kawasaki (JP); Kenichirou Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 214 days.

(21) Appl. No.: 13/064,566

(22) Filed: Mar. 31, 2011

(65) Prior Publication Data
US 2011/0252278 A1    Oct. 13, 2011

Related U.S. Application Data

(63) Continuation of application No. PCT/JP2008/068045, filed on Oct. 3, 2008.

(51) Int. Cl.
*G06F 9/44* (2006.01)
*G06F 11/00* (2006.01)

(52) U.S. Cl.
USPC .......................... 717/124; 717/127; 714/38.1

(58) Field of Classification Search
USPC ........................................................ 717/124
See application file for complete search history.

(56) References Cited

U.S. PATENT DOCUMENTS

| | | | |
|---|---|---|---|
| 6,993,682 B2 * | 1/2006 | Corrie | 714/38.14 |
| 7,707,578 B1 * | 4/2010 | Zedlewski et al. | 718/102 |
| 7,849,362 B2 | 12/2010 | Devins et al. | |
| 8,032,351 B2 * | 10/2011 | Stringham | 703/21 |
| 8,151,263 B1 * | 4/2012 | Venkitachalam et al. | 718/1 |
| 8,181,159 B2 * | 5/2012 | Khalil et al. | 717/124 |
| 8,336,029 B1 * | 12/2012 | McFadden et al. | 717/124 |
| 8,352,942 B2 * | 1/2013 | Shimogawa | 718/1 |
| 2003/0041288 A1 * | 2/2003 | Kolawa et al. | 714/38 |
| 2003/0233635 A1 * | 12/2003 | Corrie | 717/124 |
| 2004/0010787 A1 | 1/2004 | Traut et al. | |

(Continued)

FOREIGN PATENT DOCUMENTS

| | | |
|---|---|---|
| JP | 04-195436 | 7/1992 |
| JP | 08-137719 | 5/1996 |

(Continued)

OTHER PUBLICATIONS

Marko Zec, "Implementing a Clonable Network Stack in the FreeBSD Kernel", USENIX Annual Technical Conference, FREENIX . . . , 2003—db2.usenix.org, retrieved from <http://db2.usenix.org/publications/library/proceedings/usenix03/tech/freenix03/full_papers/zec/zec_html/> total pp. 18.*

(Continued)

*Primary Examiner* — Don Wong
*Assistant Examiner* — Marina Lee
(74) *Attorney, Agent, or Firm* — Staas & Halsey LLP

(57) ABSTRACT

A method for testing an application in a virtual computer system includes transmitting a request to select one of first and second conditions of a test of the application from a first virtual machine to execute the test of the application to a second virtual machine to control the virtual computer system via a virtual computer monitor, generating, if the virtual machine monitor receives the request to select the one of the first and second conditions of the test of the application, a clone of the first virtual machine by the virtual machine monitor, and executing the test of the application based on the first condition in the first virtual machine while executing the test of the application based on the second condition in the generated clone of the first virtual machine.

12 Claims, 12 Drawing Sheets

(56) References Cited

U.S. PATENT DOCUMENTS

| | | | |
|---|---|---|---|
| 2004/0025088 A1* | 2/2004 | Avvari et al. | 714/38 |
| 2006/0037002 A1* | 2/2006 | Vinberg et al. | 717/124 |
| 2007/0271483 A1* | 11/2007 | Kolawa et al. | 714/38 |
| 2008/0127103 A1* | 5/2008 | Bak | 717/126 |
| 2008/0133208 A1* | 6/2008 | Stringham | 703/20 |
| 2008/0134175 A1* | 6/2008 | Fitzgerald et al. | 718/1 |
| 2008/0134177 A1* | 6/2008 | Fitzgerald et al. | 718/1 |
| 2008/0134178 A1* | 6/2008 | Fitzgerald et al. | 718/1 |
| 2008/0163210 A1* | 7/2008 | Bowman et al. | 718/1 |
| 2008/0184225 A1* | 7/2008 | Fitzgerald et al. | 718/1 |
| 2008/0244525 A1* | 10/2008 | Khalil et al. | 717/124 |
| 2009/0204964 A1* | 8/2009 | Foley et al. | 718/1 |
| 2009/0300614 A1* | 12/2009 | Shimogawa | 718/1 |
| 2010/0049930 A1* | 2/2010 | Pershin et al. | 711/162 |
| 2010/0293144 A1* | 11/2010 | Bonnet | 707/640 |
| 2011/0231843 A1* | 9/2011 | Shimogawa | 718/1 |
| 2011/0252278 A1* | 10/2011 | Kanno et al. | 714/38.1 |
| 2012/0084607 A1* | 4/2012 | Lam et al. | 714/38.1 |
| 2013/0104129 A1* | 4/2013 | Shimogawa | 718/1 |

FOREIGN PATENT DOCUMENTS

| | | |
|---|---|---|
| JP | 09-069056 | 3/1997 |
| JP | 2004-133894 | 4/2004 |
| JP | 2007-164781 | 6/2007 |

OTHER PUBLICATIONS

Hiroo Shirasaki, "VMare Workstation 5.0.0" Unix Magazine, Jun. 1, 2005, vol. 20, No. 6, pp. 23-36.

International Search Report for PCT/JP2008/068045, Mailed Nov. 4, 2008.

Hiroo Shirasaki, "VMware Workstation 5.0.0", Unix Magazine, Jun. 1, 2005, No. 6, pp. 23-36, p. 28, left column, line 29 to right column, line 10.

* cited by examiner

FIG.4A

| ITEM | DESCRIPTION | STORED EXAMPLE |
|---|---|---|
| test | TEST PROGRESS IDENTIFIER DATA | yes OR no |

| ITEM | DESCRIPTION | STORED EXAMPLE |
|---|---|---|
| select1 | SELECTOR 1 | yes |
| select2 | SELECTOR 2 | no |
| selectn | SELECTOR n | aaa |
| .... | | |
| result | RESULT | file-1, network packet-1 console screen 1, etc. |

| No. | VALUE OF SELECTOR 1 | VALUE OF SELECTOR 2 | VALUE OF SUBSEQUENT SELECTOR | EXECUTABLE DOMAIN NAME | STATUS |
|---|---|---|---|---|---|
| CASE1 | yes | yes | ‥ | guest1 | TESTED |
| CASE2 | yes | no | ‥ | guest2 | TESTING |
| CASE3 | no | yes | ‥ | guest1 | TESTING |
| CASE4 | no | no | ‥ | guest2 | UNTESTED |

```
result report
SELECTOR 1     SELECTOR 2     SELECTOR 3     RESULT
yes            no             aaa            file1:aa.aa.bb.cc
yes            no             bbb            file1:aa.bb.bb.dd
yes            yes            aaa            file1:aa.cc.aa.aa
yes            yes            bbb            file1:aa.dd.bb.cc
no             no             aaa            file1:bb.aa.bb.cc
```

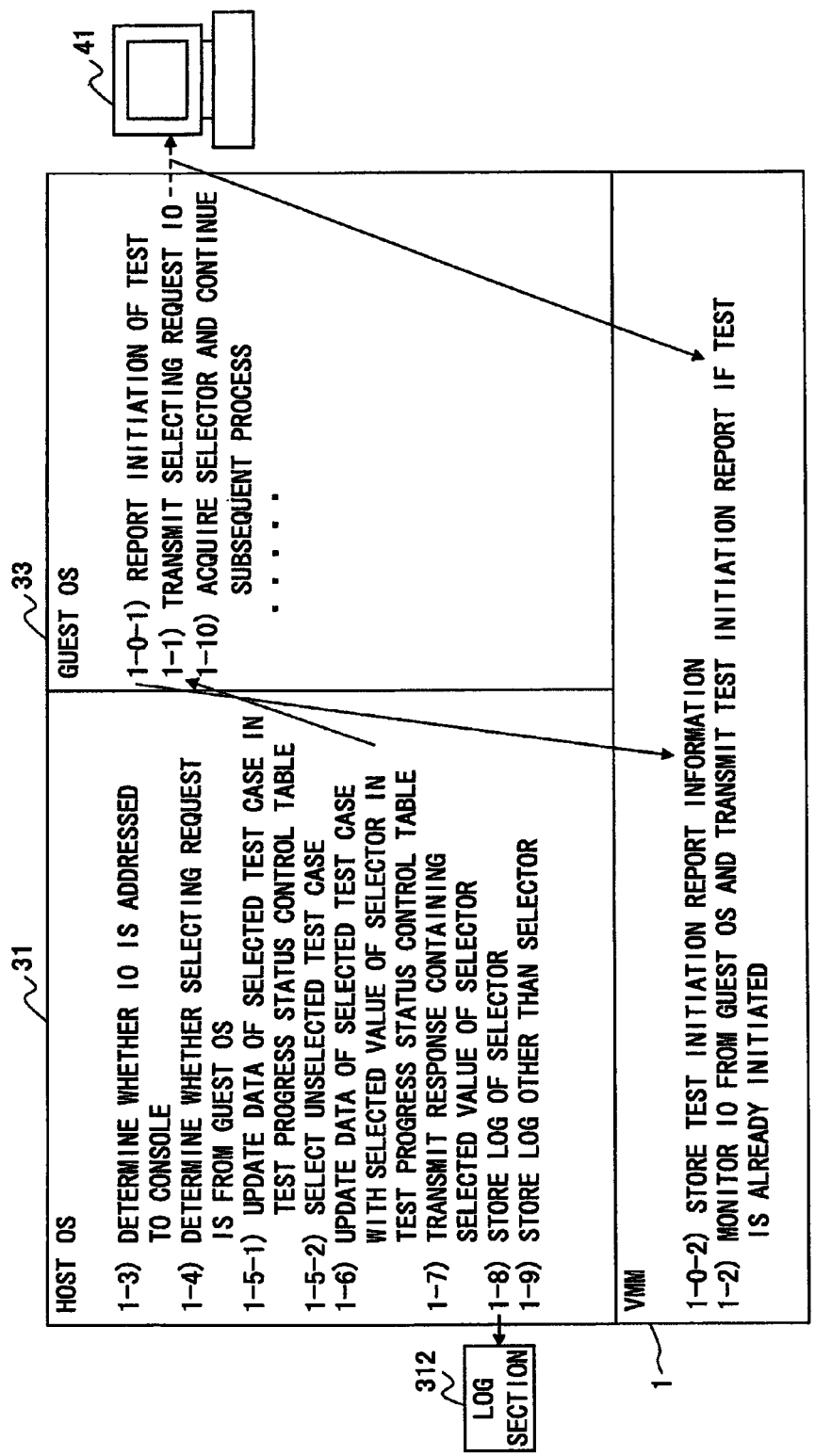

VIRTUAL COMPUTER SYSTEM, TEST METHOD, AND RECORDING MEDIUM

CROSS-REFERENCE TO RELATED APPLICATIONS

The present application is a U.S. continuation application filed under 35 USC 111(a) claiming benefit under 35 U.S.C. 120 and 365(c) of PCT International application No. PCT/JP2008/068045 filed on Oct. 3, 2008, the entire contents of which are incorporated herein by reference.

FIELD

The present embodiments discussed herein are related to a virtual computer system, a test method, and a recording medium.

BACKGROUND

A virtual computer system includes two or more virtual machines each having their own operating systems (OSes). Thus, such virtual machines may be allocated to different specific functions. The virtual machines, that is, the OSes that execute an application program (hereinafter simply called an "application") are called "guest OSes". The application operating on the guest OSes may need to be tested to verify whether the application operates normally before shipping.

Note that Japanese Laid-Open Patent Application Publication No. 4-195436 discloses, for example, an automatic testing technology that may provide testing environments to automatically run separate application tests in real computers and virtual computers.

In addition, Japanese Laid-Open Patent Application Publication No. 2007-164781 discloses, for example, a method and a system of system-on-chip (SoC) design verification of inter-cluster interactions using simulation processes. The method and the system include creating a test case that is dependent upon known sequences; and executing the test case on an originating processor until it reaches a known point.

Further, Japanese Laid-Open Patent Application Publication No. 9-69056 discloses, for example, a test support device for computer program components that automatically tests the computer program components and reports a test state. This test support device includes a test case storage unit that stores a test case, a test state gathering unit that gathers the test state of the test case based on the test case stored in the test case storage unit, and a test state informing unit that reports the test state received from the test state gathering unit.

SUMMARY

In one embodiment, there is provided a method for testing an application in a virtual computer system, which includes hardware including a CPU and a memory, first and second virtual machines each having a program operating on the CPU, and a virtual computer monitor configured to control the first and second virtual machines. The method includes transmitting a request to select one of first and second conditions of a test of the application from the first virtual machine configured to execute the test of the application to the second virtual machine configured to control the virtual computer system via the virtual computer monitor; generating, if the virtual machine monitor receives the request to select the one of the first and second conditions of the test of the application, a clone of the first virtual machine by the virtual machine monitor; and executing the test of the application based on the first condition in the first virtual machine while executing the test of the application based on the second condition in the generated clone of the first virtual machine.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 4A through 4D are diagrams illustrating respective structural examples of a monitoring table, a log data table, and a control table;

FIG. 5 is an explanatory diagram illustrating operations of the virtual computer system according to the embodiment;

DESCRIPTION OF EMBODIMENTS

A description is given, with reference to the accompanying drawings, of embodiments of the present invention. However, a comparative example of a virtual computer system is illustrated before the description of the embodiments.

Figure 12:
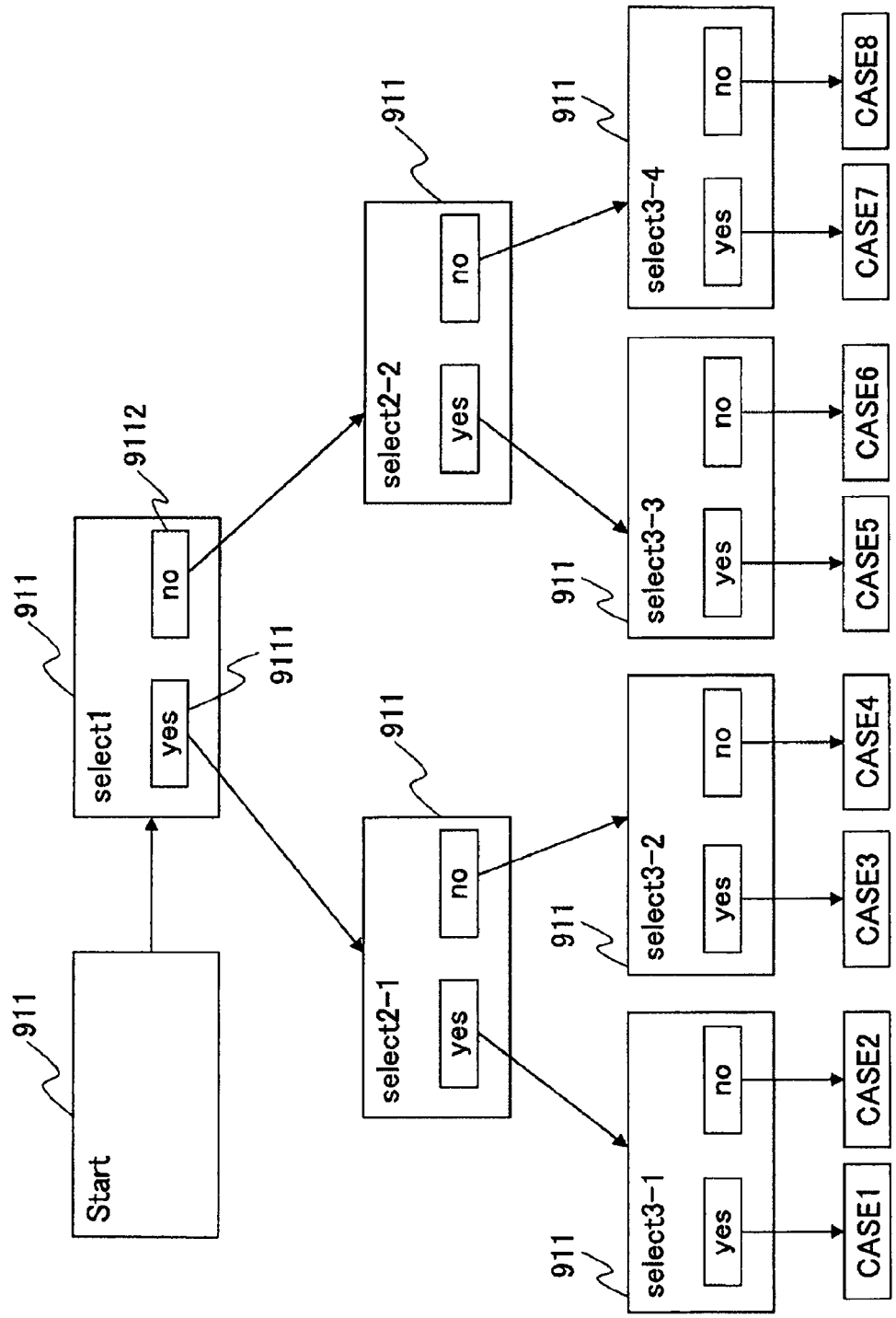
FIG. 12 is an explanatory diagram illustrating a comparative example of a virtual computer system according to the embodiment.

FIG. 12 is an explanatory diagram illustrating a test of an application for use in the comparative example of a virtual computer system.

In general, it is preferable that applications operating on guest OSes be tested by selectively combining various expected test conditions. For example, an application operating on a guest OS may be tested in the following application test process. In the application test process, an operator is repeatedly prompted by the application to select one of selectors that represent test conditions of the application to combine the test conditions (i.e., selectors). Accordingly, the application operating on the guest OS may be tested based on the various combinations of the test conditions selected by the operator.

For example, when the application operating on the OS in the virtual computer system is tested, a display screen 911 of a console is displayed to the operator, who carries out the application test as illustrated in FIG. 12. After "Start" representing the initiation of running the application is displayed on the display screen 911, a first select screen "select 1" is displayed on the display screen 911. In this case, the operator selects one of a selector 9111 indicating "yes" and a selector 9112 indicating "no" that are given by the application.

Likewise, the operator selects one of selectors "yes" (9111) and "no" (9112) displayed on a second select screen (i.e., select screen select 2-1 or select 2-2), and subsequently selects one of selectors "yes" (9111) and "no" (9112) displayed on a third select screen (i.e., one of select 3-1 to select 3-4).

As illustrated in FIG. 12, a first test case CASE 1 is one of the combined test conditions. The first test case CASE 1 is obtained (combined) by the operator's selecting "yes" (i.e., the selector 9111) on the first select screen select 1, "yes" on the second select screen select 2-1, and "yes" on the third select screen select 3-1. The select screen select 2-1 is displayed when the operator has selected "yes" (i.e., 9111) on the first select screen select 1, and other select screens are displayed in similar manners. A second test case CASE 2 and other test cases are obtained in the same manner as the test case CASE 1.

In this example of FIG. 12, since the operator selects the selectors (i.e., the same selectors 9111 indicating "yes" in this example) three times, a total of eight test cases, that is, the CASE 1 through CASE 8 may need to be carried out to cover all the test conditions.

However, if a new test condition is desired to be added to a collection of the test conditions, the combinations of which form the test cases (i.e., the CASE 1 through CASE 8 in this example), a new test case corresponding to the new test condition is duplicated (i.e., two test cases are added to the existing test cases) every time a new test condition is added. Accordingly, if the number of test conditions is large, the number of test cases may be significantly increased, and the number of times the operator selects test conditions may also be increased. Thus, a test time may be increased due to the increase in the number of the operator's repeated selecting operations. In addition, if the test conditions are selected by the operator, some test conditions may be left out (i.e., some test cases may not be carried out), which may reduce testing reliability. Further, if such test cases including the operator's selecting operations are automated or computerized, the missing out of the test conditions may be prevented. However, if the application test is automated or computerized, every test case may need to start with the first test condition (i.e., first select screen select 1 in FIG. 12), which may reduce testing efficiency.

Figure 1:
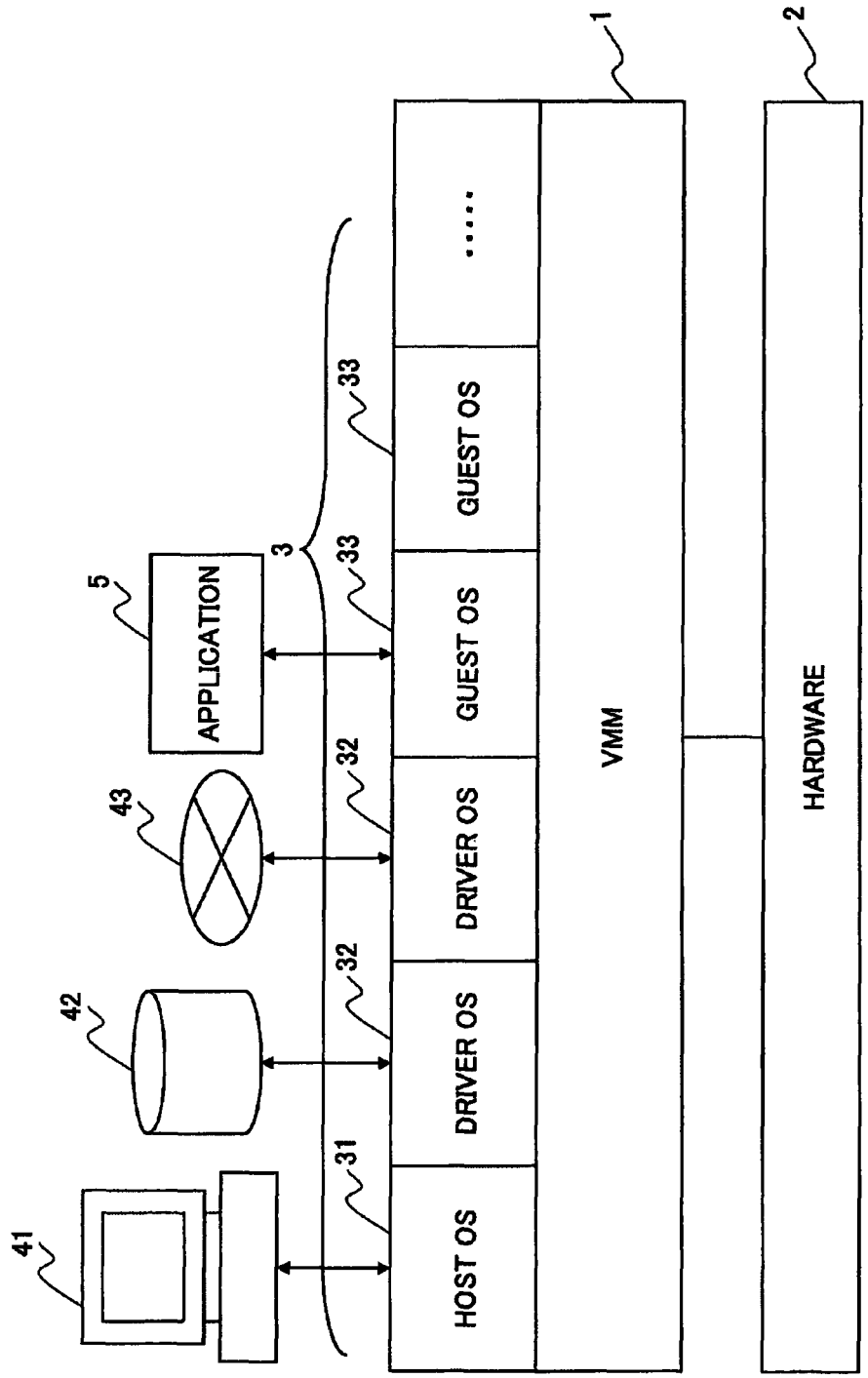
FIG. 1 is a diagram illustrating an exemplified configuration of a virtual computer system according to an embodiment.

Next, an embodiment is described with reference to accompanying drawings. FIG. 1 is a diagram illustrating an exemplified configuration of a virtual computer system according to the embodiment. The virtual computer system according to the embodiment includes a virtual machine monitor (VMM) or a hypervisor 1, hardware 2, and plural virtual machines 3. The VMM 1 and the virtual machines 3 are configured to run on the hardware 2.

The virtual computer system includes two or more virtual machines 3. Specifically, the virtual machines 3 include a host OS (operating system/i.e., a control program) 31, driver OSes 32, and guest OSes 33. That is, the respective OSes 31 to 33 of the virtual machines 3 are implemented based upon acquisition of control of a physical CPU or a real CPU and execution of its control on the physical or real CPU. The VMM 1 may be implemented in the same manner as the virtual machines 3.

The VMM 1 is configured to control the entire virtual computer system. That is, the VMM 1 is configured to control dispatch (i.e., physical CPU control allocation) of the plural virtual machines 3 including the host OS 31, the driver OSes 32, and the guest OSes 33, emulation of privileged instructions to be executed by the host OS 31, the driver OSes 32, and the guest OSes 33, and operation of the hardware 2 such as the physical CPU.

A host OS 31 operating as a virtual machine (domain) is provided such that the host OS 31 controls the entire virtual computer system. The host OS 31 is activated at a startup operation of the virtual computer system, and then controls the driver OSes 32 or the guest OSes 33 such as activation or termination of the driver OSes 32 or the guest OSes 33. The host OS 31 may also operate as the driver OS 32. The host OS 31 includes a console (i.e., a terminal) 41 such as input and output devices.

The driver OSes 32 are configured to control physical (or real) input and output devices (I/O devices) 42 and 43. The physical I/O devices 42 and 43 may include a magnetic disk device 42 and a network 43. The physical input and output devices (I/O devices) 42 and 43 each include one of the driver OSes 32. The physical input and output devices (I/O devices) 42 and 43 are controlled by the corresponding driver OSes 32. The driver OSes 32 may also operate on the host OS 31 or the guest OSes 33. If the driver OS 32 operates on the guest OS 33, the guest OS 33 appears as a (dummy) driver OS 32.

The guest OSes 33 do not include physical (or real) input and output devices (I/O devices) 42 and 43. The guest OSes are so called operating systems "OS". The application program (hereinafter simply called "application") 5 operates on one of the guest OSes 33. The application 5 includes a set of programs to be tested. When the guest OS 33 requests the driver OS 32 to execute an IO instruction, the requested IO instruction is ready to be executed.

Figure 2:
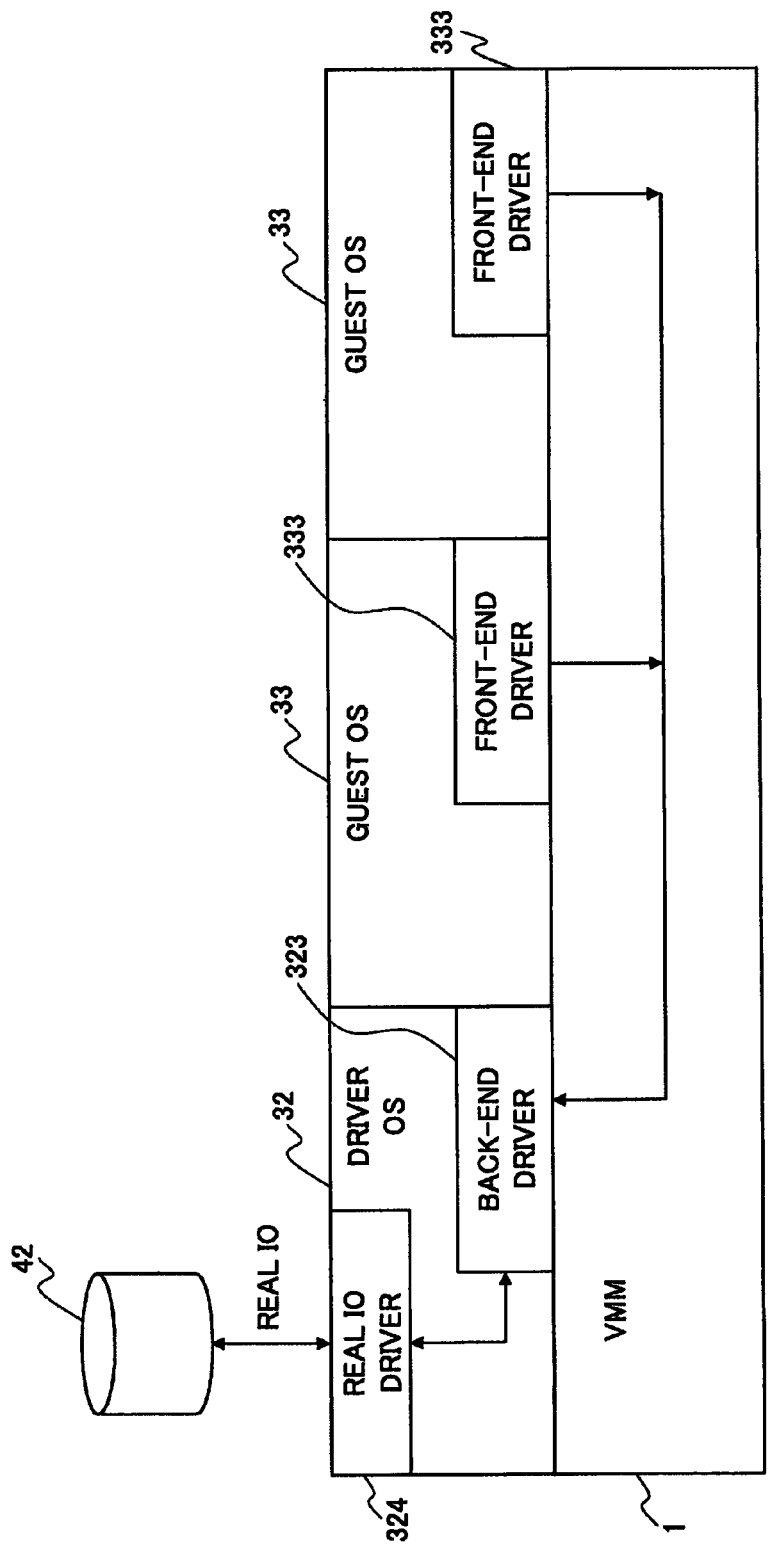
FIG. 2 is another diagram illustrating the exemplified configuration of a virtual computer system according to the embodiment.

FIG. 2 is a diagram illustrating a driver configuration of the virtual computer system according to the embodiment illustrated in FIG. 1. The driver OS 32 includes a backend driver 323 and a real input/output (IO) driver 324. The guest OSes 33 each include frontend drivers 333.

The backend driver 323 is provided in the driver OS 32 and is configured to transmit and receive the IO instructions between the driver OS 32 and the guest OSes 33. The frontend drivers 333 are provided in the corresponding guest OSes 33 and are configured to transmit and receive the IO instructions between the driver OS 33 and the guest OSes 32.

For example, the guest OS 33 requests the backend driver 323 to execute the IO instructions via the frontend driver 333. The IO instruction executing request is executed via the VMM 1. More specifically, the frontend driver 333 transmits an IO execution request to the VMM 1 to request the backend driver 323 to execute the IO instruction. On receiving the IO execution request, the VMM 1 requests the backend driver 323 to execute the IO instruction.

The real IO driver 324 is provided in the driver OS 32 and is configured to execute the IO instructions received by the backend driver 323 on the physical IO devices 42 and 43. For example, data may be retrieved from or recorded on the magnetic disk device 42 in the above process. Note that the illustration of the network 43 is omitted from FIG. 2.

Figure 3:
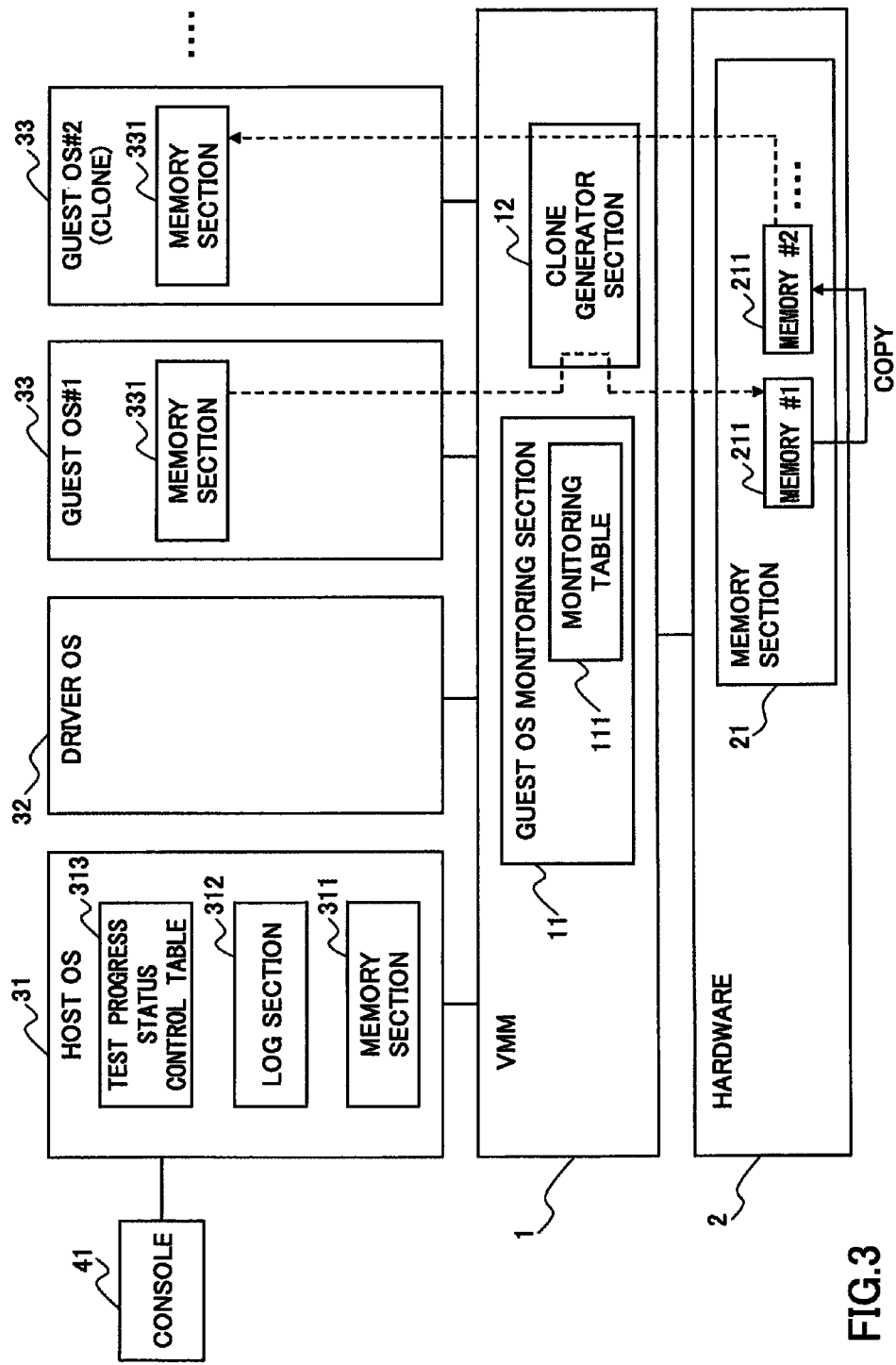
FIG. 3 is still another diagram illustrating the exemplified configuration of a virtual computer system according to the embodiment.

FIG. 3 is a diagram illustrating exemplified configurations of the VMM 1 and the hardware 2.

The VMM 1 includes a guest OS monitoring section 11 and a clone generator section 12. The VMM 1 further includes a monitoring table 111. The hardware 2 includes a not-illustrated physical CPU and a memory section 21. The memory section 21 includes two or more memories 211. The host OS 31 includes a memory section 311, a log section (or a log table) 312, and a test progress status control table 313. The guest OSes 33 include memory sections 331. Note that the backend driver 323 illustrated in FIG. 2 is omitted from FIG. 3.

The guest OS monitoring section 11 is configured to monitor the guest OSes 33 based on an IO instruction executing request received from the guest OSes 33. The IO instructions include a predetermined format. Thus, the IO instructions may be identified based on the predetermined formats of the IO instructions. Further, whether an IO instruction is given from the console 41, that is, whether an IO instruction is a later-described IO instruction given by the console 41 (or console IO instruction) may also be identified. Moreover, whether an IO instruction is a later-described condition selecting request given by the guest OS 33 (or guest OS 33 condition selecting request) may also be identified. Further, the guest OS monitoring section 11 determines whether a test of the application has been initiated and whether the test of the application 5 is currently in progress by referring to the monitoring table 11. The guest OS monitoring section 11 stores data identifying whether the test of the application 5 is currently in progress (hereinafter called "test progress identifier data") in the monitoring table 111.

FIG. 4A illustrates a structural example of the monitoring table 111. The monitoring table 111 includes the test progress identifier data based on the test (test name) of the application 5. The test progress identifier data stored in the monitoring table 111 are used to identify whether the test of the application 5 is currently in progress. The test progress identifier data are stored as "yes" in the monitoring table 111 when the test is currently in progress and "no" in the monitoring table 111 when the test is not in progress.

That is, the guest OS monitoring section 11 determines that the test of the application 5 is in progress if the test has been initiated and has not been finished. In this case, the guest OS monitoring section 11 stores the "yes" as the test progress identifier data in the monitoring table 111. Likewise, the guest OS monitoring section 11 stores the "no" as the test progress identifier data in the monitoring table 111 if the test has not been initiated or if the test has already been finished. With such data, the guest OS monitoring section 11 transmits a report including a test progress status of the test of the application 5 operating on the OS 33 to the host OS 31.

In the test of application 5, the clone generator section 12 receives a clone generation request to generate a clone of a guest OS 33 or a clone deletion request to delete the generated clone of the guest OS 33 from the host OS 31. Thus, the clone generator section 12 is configured to generate or delete the clone of the target guest OS 33.

Note that the "clone" herein indicates a process or operation of making a copy of a memory (memory #1) of a guest OS 33 (e.g., guest OS #1) as a different memory (memory #2) at a certain point of time so that another guest OS 33 (guest OS #2) may operate based on the copied memory (memory #2) having a test status identical to the test status of the guest OS 33 (guest OS #1) at the point of time when the memory (#1) is copied. That is, the copied memory (memory #2) has the same selected test condition(s) as the memory (#1) at the time when the memory (#1) is copied. For example, in the memory section 21, the memory #1 used by the guest OS #1 is copied as the memory #2 to be used by the guest OS #2. In this case, the guest OS #2 is a clone of the guest OS #1 as illustrated in FIG. 3. Note that the memory #1 is a real memory corresponding to the memory section 331 of the guest OS #1, and the memory #2 is a real memory corresponding to the memory section 331 of the guest OS #2. The memory section 331 of the guest OS #1 is a virtual memory used by the guest OS #1. Likewise, the memory section 331 of the guest OS #2 is a virtual memory used by the guest OS #2.

In the hardware 2, the VMM 1 allocates a real CPU and real memories corresponding to the virtual machines 3. The memory section 21 is the real memory utilized by the guest OSes 33 to execute the application 5. The memory section 21 includes two or more memories (i.e., memory regions) 211 (see FIG. 3).

As illustrated in FIG. 3, the memory #1 is a memory region 211 utilized by the guest OS #1, and the memory #2 is a memory region 211 utilized by the guest OS #2. For example, the clone generator section 12 allocates the memory #1 to the application 5 operating on the guest OS #1. Similarly, the clone generator section 12 allocates the memory #2 to the application 5 operating on the guest OS #2. When the guest OS #2, which is a clone of the guest OS #1, is deleted, the memory #2 is released by the clone generator section 12.

The host OS 31 determines whether the IO instruction from any of the guest OSes 33, which is reported by the VMM 1, is addressed to the console 41. If the IO instruction is addressed to the console 41, the host OS 31 subsequently determines whether the IO instruction is a condition selecting request, which is a request to select one of the selectors of the test condition based on which the test of the application is 5 desired to be executed. If the condition selecting request is transmitted from the guest OS 33, the host OS 31 determines whether data of the condition selecting request, which is a value of the selected selector, are already stored in a test progress status control table 313 by referring to the test progress status control table 313.

FIG. 4C illustrates a structural example of the test progress status control table 313. The test progress status control table 313 stores respective values of the selectors of the corresponding test condition, a domain name, and a test progress status for every test case of the application 5. Thus, if the two or more test cases (e.g., CASE 1 to CASE 8 in FIG. 11) are concurrently conducted, the two or more test progress status control tables 313 are created accordingly. The value acquired by the selector is one of "yes" and "no" information. In the test progress status control table 313 illustrated in FIG. 4C, the executable domain name section includes a name of the domain (i.e., the virtual machine or OS) in which one of the test cases of the application 5 is executed. A status section includes a "tested" status when a test case (i.e., a combination of test conditions) is finished or a "testing" status when the test case has not been finished.

The host OS 31 stores data (i.e., a value of the selector) corresponding to the test case described above in the test progress status control table 313 if the data corresponding to the test case requested by the condition selecting request have not been stored; that is, if the selector corresponding to the test case is yet to be selected. By contrast, the host OS 31 does not store the above data (i.e., the value of the selector) in the test progress status control table 313 if the data (i.e., value of the selector) corresponding to the test case requested by the condition selecting request have already been stored in the test progress status control table 313.

Further, the host OS 31 determines whether there is a sufficient resource for generating a clone of the guest OS 33 if the data (i.e., the value of the selector) corresponding to the test case requested by the condition selecting request have not been stored (i.e., the value of the selector (data) have not been selected) in the test progress status control table 313. Note that the sufficient resource for generating a clone of the guest OS 33 indicates a free space region in the memory section 21 having a capacity large enough to store a copy of the memory #1 of the guest OS #1. Further, the host OS 31 requests the clone generator section 12 to generate a clone of the guest OS 33 (#1) if the data (i.e., the value of the selector) corresponding to the test case requested by the condition selecting request have not been stored in the test progress status control table 313, and if there is the sufficient resource.

The host OS 31 transmits a response containing a value of the selected selector to the guest OS 33 that has transmitted the condition selecting request, and stores a log of the response (i.e., the value of the selector selected in response to the condition selecting request). That is, the host OS 31 stores a test result (log) corresponding to the value of the selected selector of the test case of the application 5 in the log section 312.

FIG. 4B illustrates an example of a structure of a log stored in the log section 312. The log section 312 is a memory configured to store the test result (log) corresponding to the values of the selected selectors of the test case of the application 5. As illustrated in FIG. 4B, the log section 312 stores selector information (i.e., select 1, select 2, . . . , and select n) and result information (result). The select information includes respective values of the selectors of the test case of the application 5. For example, the value of the selector includes a "yes" if the selector "yes" is selected, and the value of the selector includes "no" if the selector "no" is selected. The result information includes a log file containing the test result such as file-1, a packet such as a network packet-1, and a screen such as a console screen 1.

Note that the response may contain values other than the yes and no values of the selectors. For example, the test program may request a string such as a user ID. In such a case, the response may contain a randomly selected character string such as "aaa" as illustrated in FIG. 4B. In the test case utilizing the randomly selected character string, a response requested by the application 5 may be obtained by applying a character string having a certain pattern.

The host OS 31 requests the clone generator section 12 to delete, when the test case carried out in the guest OS 33 is finished, the generated guest OS 33. The clone generator section 12 executes, on receiving the request to delete the generated clone guest OS 33 (#2), the deletion of the generated guest OS 33 (#2) that is the clone of the guest OS 33 (#1). Further, the host OS 31 retrieves, having reported the clone deletion request to the clone generator section 12, the log stored in the log section 312 at the clone deletion request reporting time, and transmits the retrieved log to the physical IO device 41, 42, or 43 or stores the retrieved log in the physical IO device 41, 42, or 43 as a test result 412 (see FIG. 4D).

FIG. 4D illustrates an example of the test result 412 output to the console 41. The test result 412 is output from the log section 312. The test result 412 may include the respective values acquired by the selectors, and file names (e.g., "file 1: aa.aa.bb.cc" in FIG. 4D) for storing the test result obtained by the executing the value of the selectors. Note that the host OS 31 edits the log section 312 based on a predetermined process and outputs the edited log as the test result 412.

When the above-described test of the application 5 is initiated, the guest OS 33 transmits a test initiation report to the VMM 1. The guest OS 33 executes the IO instruction of the condition selecting request in the console 41. On receiving a response to the condition selecting request from the host OS 31, the guest OS 33 executes the IO instruction of the condition selecting request by applying the value of the selected selector contained in the response to the test of the application 5.

That is, if the guest OS 33 (#2) that is the clone of the guest OS 33 (#1) receives the response containing the value of the selected selector, the guest OS 33 (#2) executes the IO instruction of the condition selecting request by applying the value of the selected selector contained in the received response to the test of the application 5. Thereafter, the guest OS 33 repeats similar operations, and transmits a test completion report of the application 5 to the host OS 31.

On receiving the test completion report of the application 5, the host OS 31 requests the clone generator section 12 to delete the guest OS 33 (#2) that is the clone of the guest OS 33 (#1). The clone generator section 12 releases the memory #2 of the memory section 21 in response to the clone deletion request received from the host OS 31. As a result, the guest OS 33 (#2) that is the clone of the guest OS 33 (#1) is deleted.

As described above, the clone generator section 12 of the VMM 1 generates the clone of the guest OS 33 (#1). For example, the clone generator section 12 of the VMM 1 may generate the clone of the guest OS 33 (#1) by copying the memory #1 of the guest OS 33 (#1) onto the memory #2 of the guest OS 33 (#2).

Note that the clone is generated in a predetermined case. The guest OS monitoring section 11 of the VMM 1 thus monitors the guest OS 33 to detect if the predetermined case occurs. Specifically, when the guest OS 33 (#1) requests the host OS 31 to select one of the test conditions (i.e., one of the selectors) of the test of the application 5 via the VMM 1, the guest OS monitoring section 11 detects the transmitted request to select the test condition of the application 5. The clone generator section 12 generates a clone of the guest OS 33 (#1) based on the detected request to select the test condition of the application 5. Note that the selection of the test condition may be requested via the VMM 1.

Thus, the guest OS 33 (#1) and the generated guest OS 33 (#2) that is the clone of the guest OS 33 (#1) execute the test cases of the application 5. The test of the application 5 is conducted by causing the guest OS 33 (#1) and the clone guest OS 33 (#2) to request the driver OS 32 to execute the respective IO instructions via the VMM 1, executing the respective IO instructions, and recording the log of the requested IO instructions.

The guest OS monitoring section 11 of the VMM 1 traps or copies the IO instructions addressed to the driver OS 32 from the guest OS 33 (#1) and the clone guest OS 33 (#2), and transmits a report containing the trapped or copied IO instructions to the host OS 31. If there is a sufficient region to accommodate a clone of the guest OS 33 (#1) in the memory section 21, the host OS 31 requests, on receiving the report containing the IO instructions to generate the clone, the clone generator section 12 of the VMM 1 to generate the clone of the guest OS 33 (#1). The clone generator section 12 of the VMM 1 generates the clone of the guest OS 33 (#1) in response to the clone generating request transmitted from the host OS 31.

Next, the host OS 31, the guest OSes 33, and the VMM 1 are described in more detail with reference to FIGS. 5 to 7.

FIG. 5 is a diagram illustrating monitoring of the selection requested by the application 5 operating on the guest OS 33 and responses of the host OS 31.

The guest OS 33 reports an initiation of the test of the application 5 to the VMM 1 (process #1-0-1). The VMM 1 stores, on receiving the test initiation report from the guest OS 33, information on the test initiation report in the test progress status control table 111 (process #1-0-2).

The guest OS 33 transmits an IO instruction of the condition selecting request relating to the test of the application 5 to console 41 (process #1-1). The VMM 1 monitors the IO instruction transmitted from the guest OS 33 to the console 41 and transmits the test initiation report indicating that the test has been initiated to the host OS 31 (process #1-2). Note that in FIGS. 5 to 8, the "IO instruction" is simply expressed as "IO".

The host OS 31 determines whether the IO instruction received from the guest OS 33 reported by the VMM 1 is addressed to the console 41 (process #1-3). If the IO instruction is addressed to the console 41, the host OS 31 subsequently determines whether the IO instruction is the condition selecting request transmitted from the guest OS 33 (process #1-4).

If the condition selecting request is transmitted from the guest OS 33, the host OS 31 updates data in the test progress status control table 313 (process #1-5-1). Specifically, the host OS 31 updates the "status" section of the corresponding test case as "testing" of the test progress status control table 313 (see FIG. 4C).

Subsequently, the host OS 31 selects a test case having an unselected selector (i.e., "untested" status) of the test progress status control table 313 (process #1-5-2). Having selected the value of the unselected selector, the host OS 31 updates data of the value of the unselected selector of the test progress status control table 313 with the selected value of the selected selector (process #1-6).

Next, the host OS 31 transmits a response containing the value of the selected selector to the guest OS 33 (process #1-7). The host OS 31 stores log information of the value of the selector in the response transmitted to the guest OS 33 and information other than the information of the value of the selector in the response in the log section 312 (process #1-8 and process #1-9).

On receiving the response from the host OS 31, the guest OS 33 continues a subsequent process of the test of the application 5 by applying the selector contained in the response (process #1-10).

Figure 6:
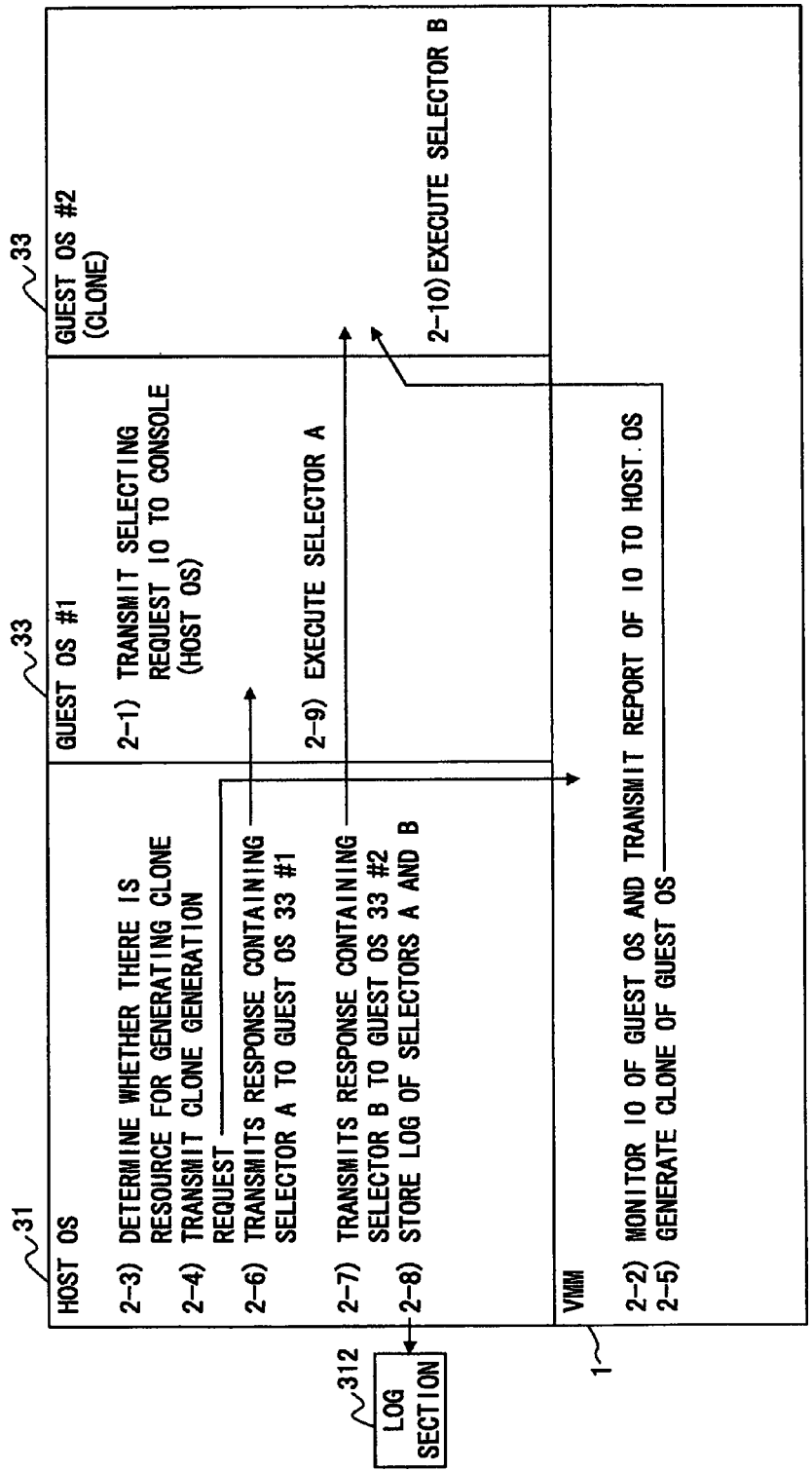
FIG. 6 is another explanatory diagram illustrating operations of the virtual computer system according to the embodiment.

FIG. 6 is an explanatory diagram illustrating operations of the clone generation and concurrent execution of the test when the condition selecting request is transmitted by the guest OS 33.

The guest OS 33 transmits, for example, an IO instruction of the condition selecting request relating to the test of the application 5 addressed to the host OS 31, namely, the console 41 (process #2-1). The guest OS monitoring section 11 of the VMM 1 configured to monitor the guest OS 33 detects the condition selecting request and transmit a report of the condition selecting request (i.e., IO instruction) to the host OS 31 (process #2-2). On receiving the report of the condition selecting request (i.e., IO instruction), the host OS 31 determines whether the memory section 21 has a sufficient resource to generate a clone of the guest OS 33 (process #2-3). If the memory section 21 has the sufficient resource, the host OS 31 requests the clone generator section 12 of the VMM 1 to generate the clone of the guest OS 33 (process #2-4).

On receiving the clone generation request, the clone generator section 12 generates the guest OS 33 (#2) that is a clone of the guest OS 33 (#1) (process #2-5).

The host OS 31, for example, transmits a response containing a selector A to the guest OS 33 (#1) (process #2-6). In addition, the host OS 31 transmits a response containing a selector B to the guest OS 33 (#2) (process #2-7). Further, the host OS 31 stores the selectors A and B contained in the responses to the guest OS 33 as a log in the log section 12 (process #2-8).

Note that the selector A indicates a selector 4111 (yes) and the selector B indicates a selector 4112 (no) in the later-described FIG. 11. Note also that the guest OS 33 (#1) is an originally existing guest OS 33. However, the guest OS 33 (#1) may be generated by selecting the selector A (4111). The guest OS 33 (#2) is a clone of the guest OS 33 (#1) generated by selecting the selector B (4112).

FIG. 6 illustrates a case where the process #2-6 and the process #2-7 are concurrently executed. Note that the process #2-6 and the process #2-7 may not be concurrently executed but may be separately executed.

The guest OS 33 (#1) executes the selector A (process #2-9) concurrently when the guest OS 33 (#2) executes the selector B (process #2-10).

Figure 7:
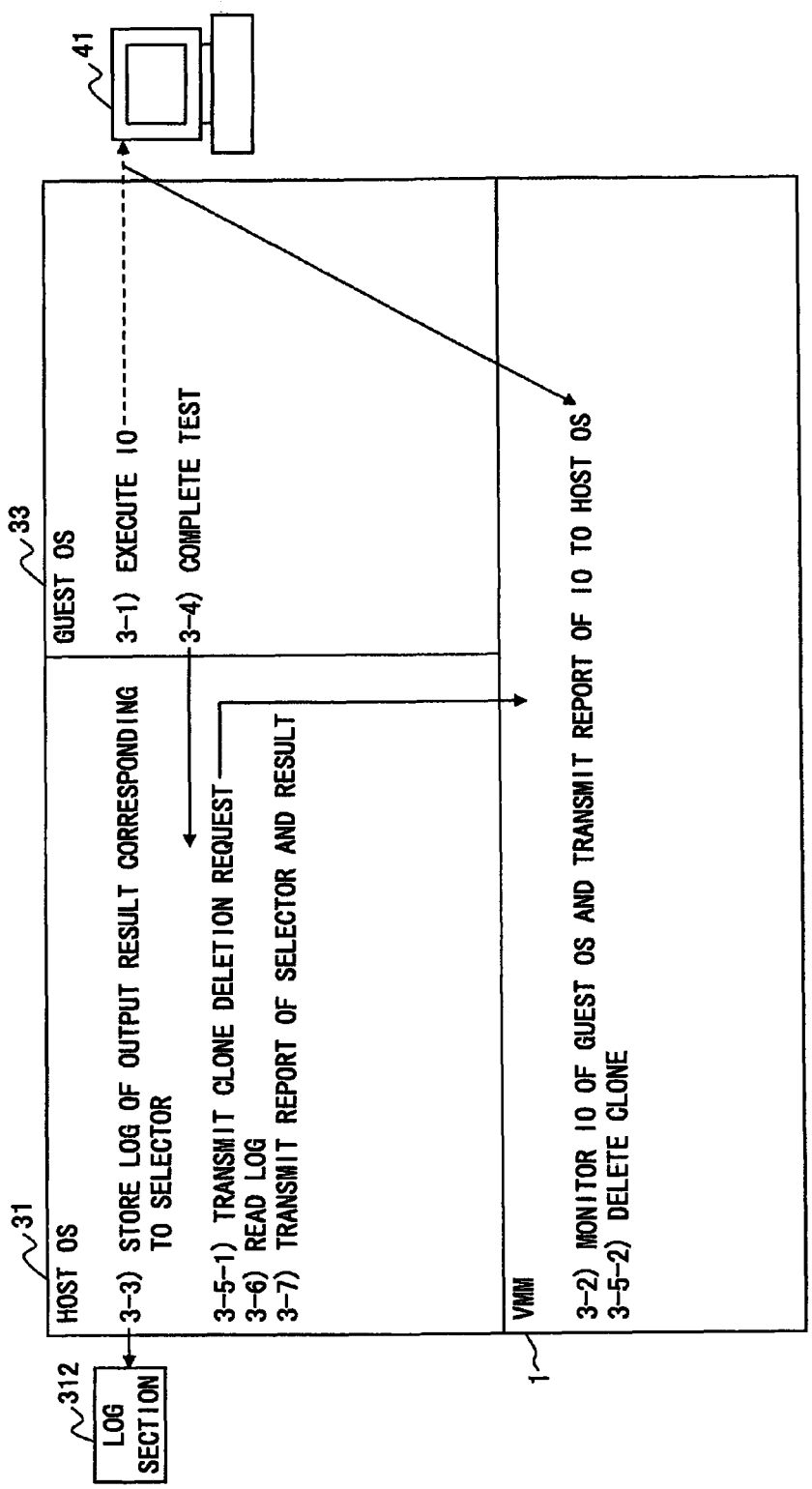
FIG. 7 is still another explanatory diagram illustrating operations of the virtual computer system according to the embodiment.

FIG. 7 is an explanatory diagram illustrating operations where the host OS 31 stores a log of an output result of the test of the application 5.

The guest OS 33 transmits an IO instruction other than the IO instruction of the condition selecting request addressed to the console 41 (process #3-1). The guest OS monitoring section 11 detects the IO instruction other than the IO instruction of the condition selecting request and transmits the detected result report to the host OS 31 (process #3-2). On receiving the detected result report of the IO instruction other than the IO instruction of the condition selecting request, the host OS 31 stores a log of an output result corresponding to the selected one of the selectors in the log section 312 (process #3-3).

When the test is complete (process #3-4), the guest OS 33 transmits a test completion report to the host OS 31. On receiving the test completion report, the host OS 31 requests the clone generator section 12 to delete the generated clone (process #3-5-1).

On receiving the clone deletion request, the clone generator section 12 deletes the guest OS 33 (#2) that is the clone of the guest OS 33 (#1) (process #3-5-2).

Having transmitted the clone deletion request to the clone generator section 12, the host OS 31 retrieves the log stored at the clone deletion request transmission time from the log section 12 (process #3-6), and outputs the selector and result as a result report (process #3-7).

Figure 8:
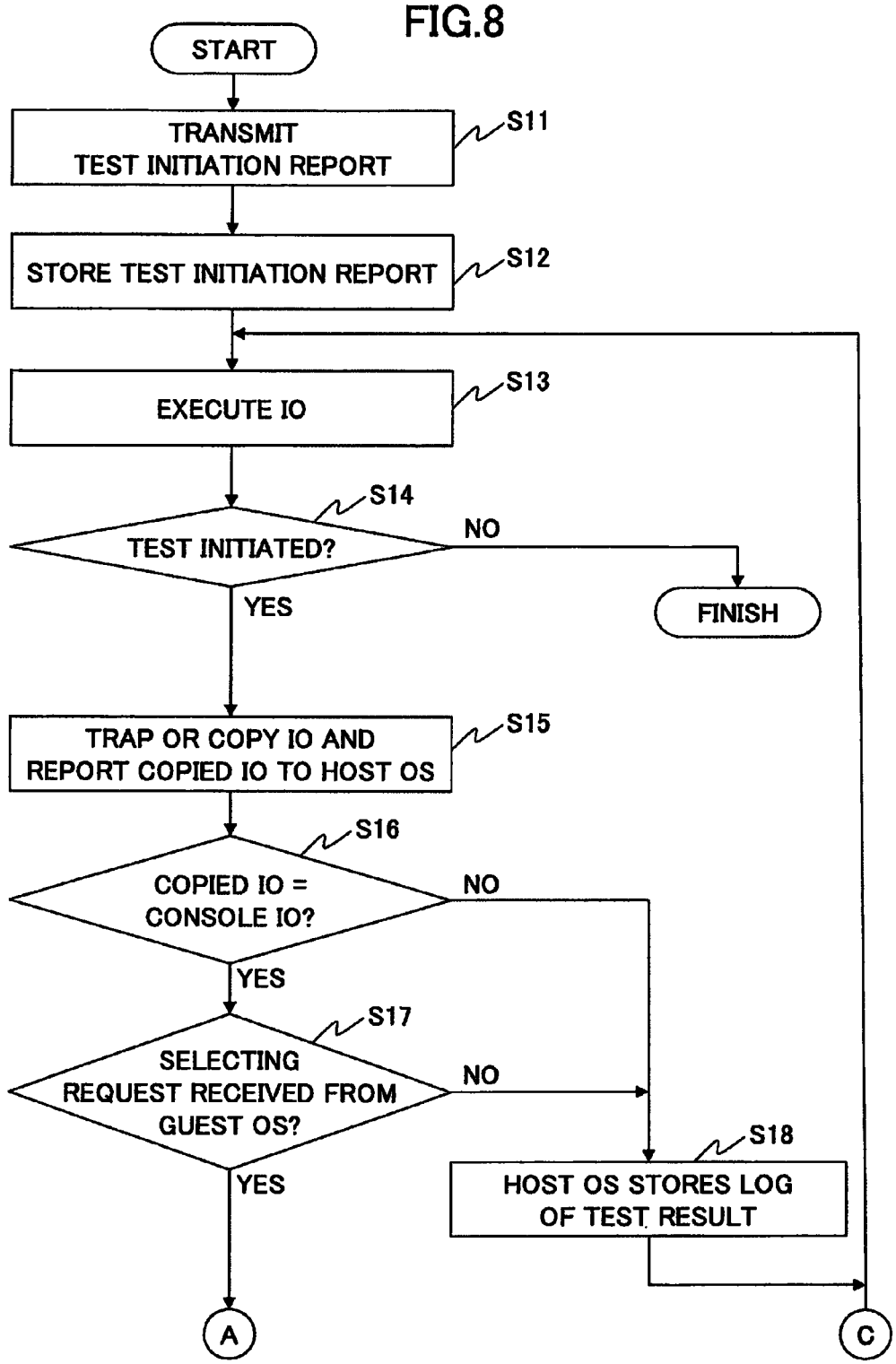
FIG. 8 is an example of a flowchart illustrating a test process in the virtual computer system according to the embodiment illustrated in FIG. 1.
Figure 9:
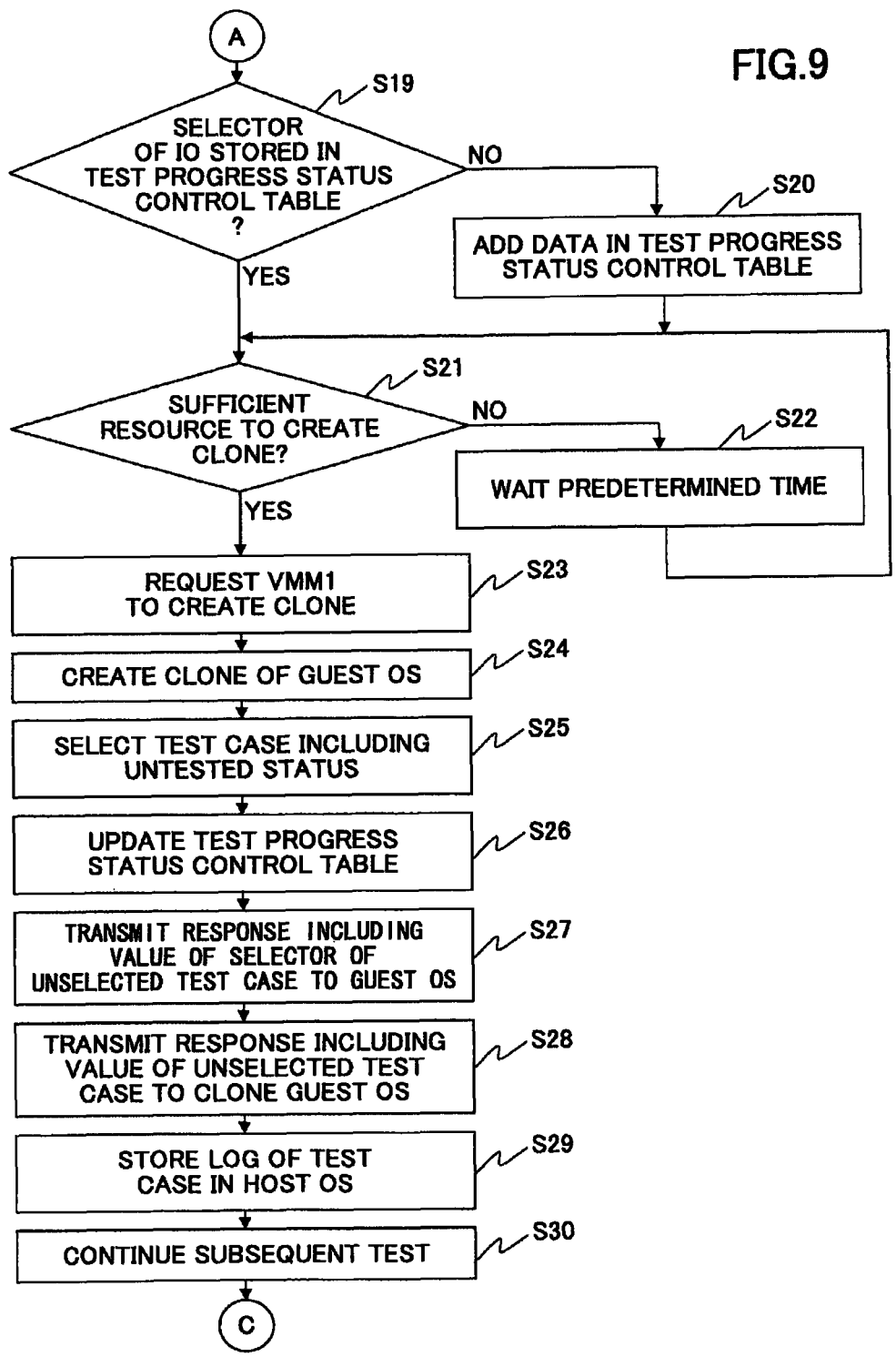
FIG. 9 is another example of a flowchart illustrating a test process in the virtual computer system according to the embodiment illustrated in FIG. 1.

FIGS. 8 and 9 are flowcharts illustrating processes of the test of the application 5 in the virtual computer system in FIG. 1.

When the test of the application 5 is initiated, the guest OS 33 transmits a test initiation report indicating the initiation of the test of the application 5 operating on the guest OS 33 to the VMM 1 (step S11). Note that step S11 corresponds, for example, to the process #1-0-1.

The VMM 1 stores, on receiving the test initiation report from the guest OS 33, the information on the test initiation report in the guest OS monitoring section 11 (step S12). Note that step S12 corresponds, for example, to the process #1-0-2. In step 12, the guest OS monitoring section 11 stores the test progress identifier data ("yes" in this example) indicating whether each test case of the application 5 is currently in progress in the monitoring table 111. For example, the VMM 1 transmits the test initiation report to the host OS 31. On receiving the test initiation report, the host OS 31 creates a log table (i.e., log section) 312 illustrated in FIG. 4B and the test progress status control table 313 illustrated in FIG. 4C. In the log table 312, for example, the number of selectors and the number of result information items may both be one, and items of the selectors and result information may each contain a null value. Further, in the test progress status control table 313, the number of test cases may be one, and items of the test cases may each contain a null value.

The guest OS 33 executes the IO instruction addressed to the host OS 31 or the driver OS 32 (step S13). Note that step S13 corresponds, for example, to the processes #1-1, #2-1, and #3-1. More specifically, in step S13, the guest OS 33 requests the VMM 1 to cause the host OS 31 or the driver OS 32 to transmit the IO instruction executing request.

On receiving the request from the guest OS, the VMM 1 determines whether the test has been initiated based on the monitoring table 111 (step S14). Note that step S14 corresponds, for example, to the process #1-2. If the test has been initiated, the VMM 1 copies the IO instruction received from the guest OS 33 and transmits a report containing the copied IO instruction to the host OS 31 (step S15). Note that step S1 corresponds, for example, to the processes #1-2, #2-2, and #3-2. If the test has not been initiated, the VMM 1 finishes the process.

The host OS 31 determines, on receiving the copied IO instruction report, whether the copied IO instruction is the IO instruction addressed to the console 41 (step S16). Note that step S16 corresponds, for example, to the process #1-3. If the IO instruction is addressed to the console 41, the host OS 31 subsequently determines whether the IO instruction is the condition selecting request transmitted from the guest OS 33 (step S17). Note that step S17 corresponds, for example, to the process #1-4.

In step S16, if the copied IO instruction is not the IO instruction addressed to the console 41, the host OS 31 stores a log of information indicating that the IO instruction is not addressed to the console 41 as a test result in the result information (result) of the log section 312 (step 18). Further, if the IO instruction is not received from the guest OS, the host OS 31 carries out the process of step S18, that is, the host OS 31 stores a log of information indicating that the IO instruction is not received from the guest OS as a test result in the result information (result) of the log section 312. Subsequently, the VMM 1 repeatedly carries out processes subsequent to the process of step S15. Note that step S18 corresponds, for example, to the processes #1-9 and #3-3.

In step S17, if the IO instruction is received from the guest OS 33, the host OS 31 subsequently determines whether a selector of the IO instruction is stored in the test progress status control table 313 (step S19). If no selector of the IO instruction is stored in the test progress status control table 313, the host OS 31 adds an appropriate selector of the IO instruction corresponding to each of the test cases in the test progress status control table 313 (step S20). Note that steps S19 and S20, for example, correspond to the process #1-5-1. If the appropriate selectors of the IO instructions corresponding to the test cases are stored in the test progress status control table 313, the process of step 20 is omitted.

Referring back to FIG. 4C, for example, it is assumed that the values of the selector 1 and the values of the selector 2 are stored but the values of the selector 3 are not stored in the test progress status control table 313. That is, in the test progress status control table 313, the values of the subsequent selector to be corresponding to the selector 3 are all null. Suppose that the first test case CASE 1 is not finished (i.e., "tested" in the status item) as illustrated in FIG. 4B, but is in progress (i.e., "testing" in the status item).

In this state, the guest OS 33 (#1) (i.e., "guest 1" in FIG. 4C) transmits the condition selecting request of the selector 3 to the console 41 in the first test case CASE 1. Since the value of the selector 3 corresponding to the first test case CASE 1 is not stored in the test progress status control table 313, the value of the selector 3 is added to the test progress status control table 313 as follows.

The condition selecting request of the selector 3 requests one of the values "yes" and "no". That is, the selector 3 may acquire two values of "yes" and "no". If one of the processes (e.g., the process where selector 3="yes" is executed) is carried out by the currently processing guest OS 33 (#1), the other process (e.g., the process where selector 3="no" is executed) is carried out by the other guest OS 33. In this case, a new blank row is inserted between the first test case CASE 1 and the second test case CASE 2 as the new test case and data of the first test case CASE 1 are copied in the new blank row of the new test case.

The value of the executable domain name of the new test case is null. The value of the status of the new test case is "untested". The value of selector 3 is added to the "subsequent selector". That is, the selector 3="no" executed by the other guest OS 33 is inserted.

On the other hand, in the first test case CASE 1, the value of "selector 3" is added to the "subsequent selector", that is, the "selector 3=yes" executed by the guest OS 33 (#1) is inserted.

Note that in practice, in the second test case CASE 2 to the fourth test case CASE 4, the new blank row is added and respective data are inserted in a similar manner as that described above. Thus, in the second test case CASE 2 to the fourth test case CASE 4, the selector 3="yes" executed by the guest OS 33 (#1) is correspondingly inserted.

Further, the new blank row inserted between the first test case CASE 1 and the second test case CASE 2 is named as a new second test case CASE 2. The original second test case CASE 2 is renamed as a new third test case CASE 3, and subsequent test cases are renamed in a similar manner. Accordingly, the new second, fourth, sixth, and eighth test cases CASE 2, CASE 4, CASE 6, and CASE 8 (hereinafter also called "new test cases") are created, and there are a total number of eight test cases, that is, the first to the eighth test cases CASE 1 to CASE 8 are prepared.

Moreover, the host OS 31 creates new log sections 312 corresponding to the new test cases in a similar manner as that of the test progress status control table 313, and inserts the values of the selectors determined by that time in the new log sections 312 (i.e., new log table 312). For example, a new log section 312 corresponding to the new second test case CASE 2 is created, and the log section 312 corresponding to the first test case CASE 1 is copied to the new log section 312. At this moment, the selector 3 (select 3) is, for example, added and the value "no" is stored as the value of the selector 3. Further, in the log section 312 of the first test case CASE 1, the selector 3 (select 3) is added and the value "yes" is stored as the value of the selector 3. In a similar manner, the selector 3 (select 3) is added and a corresponding value of the selector 3 is stored as the value of the selector 3 in the subsequent test cases.

Thereafter, if the host OS 31 needs to generate a clone of the guest OS 33, the host OS 31 determines whether there is a sufficient resource to generate the clone of the guest OS 33 (i.e., free space in the memory section 21 of the hardware 2) (step S21). Note that step S21 corresponds, for example, to the process #2-3. In step S21, for example, the host OS 31 determines whether there is a sufficient resource to generate clones for executing all the aforementioned new test cases. If there is not a sufficient resource to generate the clones for executing all the new test cases, the host OS 31 waits for a predetermined time (step S22) and repeats the process of step 21. Note that in step S21, the host OS 31 determines whether a clone of the guest OS 33 needs to be generated; that is, whether there is a new test case. If the clone of the guest OS 33 needs to be generated, the host OS 31 carries out the process of step S21, whereas if the clone of the guest OS 33 need not be generated, the processes of steps S21 to S25 are skipped (omitted).

If there is a sufficient resource to generate the clone, the host OS 31 requests the VMM 1 to generate a clone of the guest OS 33 (step S23). Note that step S23 corresponds, for example, to the process #2-4. On receiving the clone generation request, the VMM 1 instructs the clone generator section 12 to generate the clone of the guest OS 33. Thus, the clone generator section 12 generates the clone of the target guest OS 33 in the free space region of the memory section 21 based on the instruction from the VMM 1. Note that step S24 corresponds, for example, to the process #2-5. Thus, the clones for executing all the aforementioned new test cases are generated in the above-described manner.

When the host OS 31 receives the clone generation report from the VMM 1, the host OS 31 selects a test case that includes an "untested" status in the status section of the test progress status control table 313 (step S25), and updates the unselected selector of the untested status of the selected test case (step S26). Note that step S25, for example, corresponds to the process #1-5-2. Note that step S26 corresponds, for example, to the process #1-3.

In step S26, the "untested" status of the selected test case is updated with the "testing" status, and the executable domain name of the selected test case is updated with the name of the guest OS 33 that executes the test case. The guest OS 33 is the clone of the guest OS 33 generated in step S24. However, as illustrated in FIG. 4C, if the first test case CASE 1 is already tested, the guest OS 33 (i.e., guest 1) that has executed the first test case CASE 1 may execute the test case CASE 3.

Subsequently, the host OS 31 transmits a response for the condition selecting request reported in step S15 to the guest OS 33 (step S27). For example, the host OS 31 transmits the value "selector 3=yes" corresponding to the condition selecting request to the guest OS 33. Note that step S27 corresponds, for example, to the processes #1-7 and #2-6. Further, if there is the clone of the guest OS 33 (i.e., guest clone), the host OS 31 transmits the response having the status of the unselected test case to the guest clone (step S28). For example, the host OS 31 transmits the value "selector 3=no" corresponding to the condition selecting request to the clone of the guest OS 33. Note that step S28 corresponds, for example, to the process #2-7. Further, the host OS 31 stores a log relating to the condition selecting request in the corresponding log section 312 of the host OS 31 (step S29). For example, the host OS 3 stores a log relating to the value "selector 3=no" corresponding to the condition selecting request as a log of the test case CASE 1 in the corresponding log section 312 of the host OS 31. Note that step S29 corresponds, for example, to the processes #1-8 and #2-8.

Subsequently, the guest OS 33 that has received the response executes the selected selectors contained in the responses obtained in steps S27 and S28 to continue the test (step S30). That is, the guest OS 33 executes the processes subsequent to step S13. Note that step S30 corresponds, for example, to the processes #1-10, #2-9, and #2-10. For example, the guest OS 33 (#1) executes the "selector 3=yes", and the clone of the guest OS (#1) (i.e., clone guest OS 33 (#2)) executes "selector 3=no". Since the clone guest OS 33 (#2) is a copy of the guest OS 33 (#1), the test may not be repeated from the beginning (i.e., first select screen "select 1") but may start from the second select screen (i.e., select 2-1 or select 2-2) and other subsequent select screens (e.g., select 3-1, select 3-2, etc.).

Figure 10:
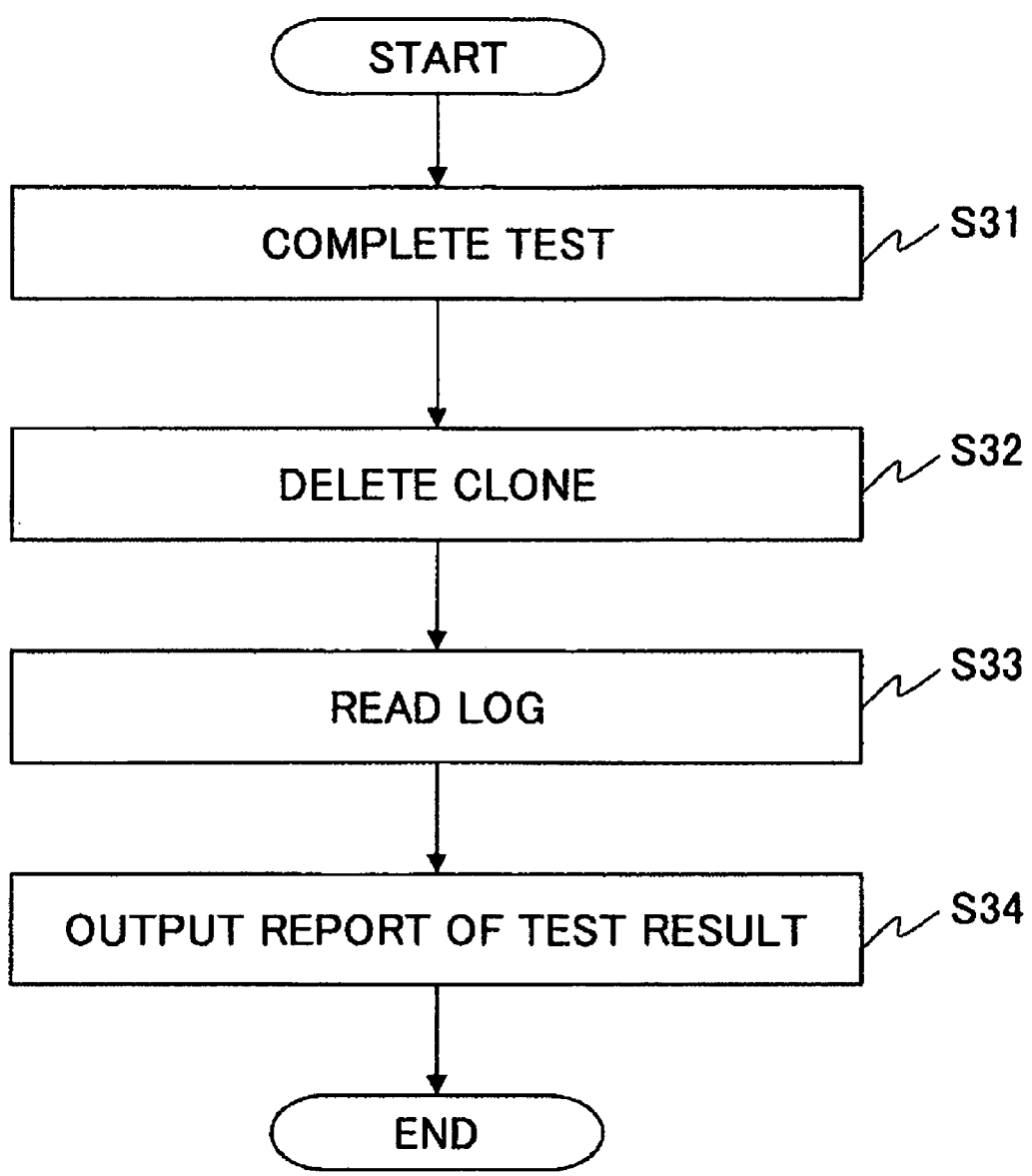
FIG. 10 is an example of a flowchart illustrating a test result output process in the virtual computer system according to the embodiment illustrated in FIG. 1.

FIG. 10 is an example of a flowchart illustrating a test result output process in the virtual computer system according to the embodiment illustrated in FIG. 1.

The guest OS 33 transmits a test completion report indicating the completion of the test of the application 5 operating on the guest OS 33 to the host OS 31 via the VMM 1 (step S31). Note that step S31 corresponds, for example, to the process #3-4. The test completion report is transmitted to the host OS 31 when the test of the application 5 is complete.

The host OS 31 requests, on receiving the test completion report from the guest OS 33, the VMM 1 to delete the clone of the guest OS 33, and the VMM 1, on receiving the clone deletion request, deletes the clone of the guest OS 33 (step S32). Note that step S32 corresponds, for example, to the processes #3-5-1 and #3-5-2. More specifically, the clone generator section 12 that has received an instruction for deleting the clone of the guest OS 33 from the VMM 1 releases a memory 211 engaged with the clone of the memory section 21 in the hardware 2. Further, the VMM 1 stores information on the received test completion report of the application 5 that operates on the guest OS 33 in the guest OS monitoring section 11. That is, the guest OS monitoring section 11 stores "no" of the test progress identifier data in the monitor table 111.

Subsequently, the host OS 31 retrieves the log of the executed test cases of the application 5 stored in the log section 312 by that time (step S33), and outputs the retrieved log of the executed test cases of the application 5 to the console 41 as a test result (step S34). Accordingly, a test result 412 illustrated in FIG. 4D may be obtained. Note that step S33 corresponds, for example, to the process #3-6. Note that step S33 corresponds, for example, to the process #3-7.

Figure 11:
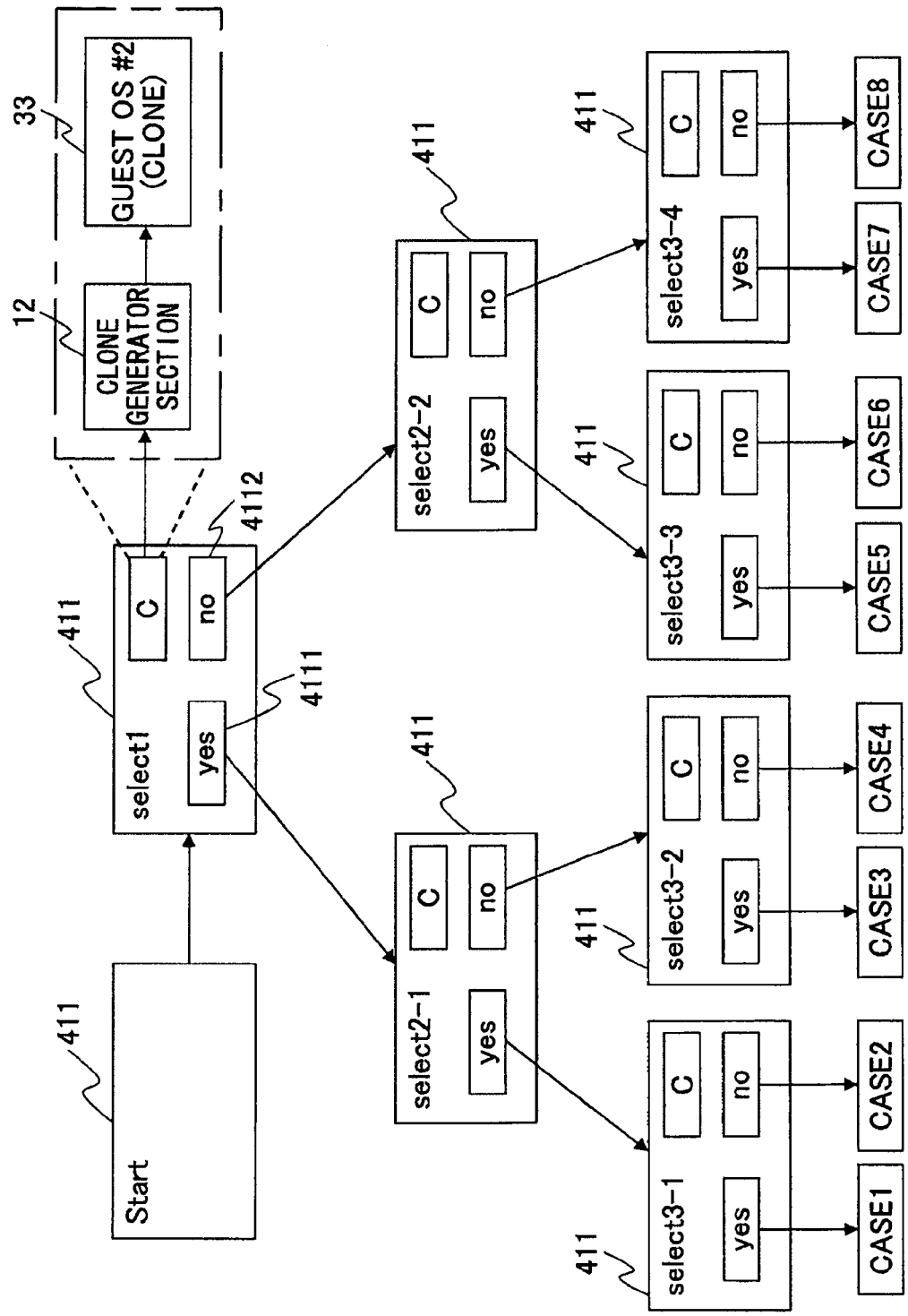
FIG. 11 is a diagram illustrating an example of an operation when a test is executed.

FIG. 11 is a diagram illustrating an example of an operation when the application test is executed. FIG. 11 illustrates a display screen 411 on the console 41 when the application 5 operating on the virtual computer system is tested.

As illustrated in FIG. 11, when the application 5 operating on the OS in the virtual computer system is tested, the display screen 411 of the console 41 is displayed to the operator, who carries out the test of the application 5. After the display screen 411 displays "Start", a first select screen "select 1" is displayed to an operator. In this case, the operator selects one of a selector 4111 indicating "yes" and a selector 4112 indicating "no" that are requested by the application 5.

At this time, the response to the selection request for the operator to select one of the selectors is reported from the guest OS 33 (#1) that executes the application 5 to the host OS 31 via the VMM 1. In the VMM 1, the clone generator section 12 generates the guest OS 33 (#2) that is a clone of the guest OS 33 (#1).

Note that in FIG. 11, an example of the generated clone guest OS 33 (#2) is illustrated with the first select screen "select 1". In other select screens "select", a reference numeral "C" indicates the generation of the clone of the guest OS 33.

Similarly, the operator selects one of selectors "yes" (4111) and "no" (4112) displayed on a second select screen (i.e., select screen select 2-1 or select 2-2), and subsequently one of selectors "yes" (4111) and "no" (4112) displayed on a third select screen (i.e., one of select 3-1 to select 3-4). The clone of the guest OS 33 is generated every time the condition selecting request for selecting one of the selectors 4111 (yes) and 4112 (no) is prompted.

The clone generator section 12 copies the guest OS 33 (#1) at the time the condition selecting request is prompted, and generates the guest OS 33 (#2) that is a copy (clone) of the guest OS 33 (#1). As a result, there are two guest OSes 33 that include the same status. Thus, the guest OS 33 (#1) may execute the test of the application 5 based on a selector condition of "yes" in the select screen select 1 (corresponding to the select screen 2-1) simultaneously when the clone guest OS 33 (#2) executes the test of the application 5 based on a selector condition of "no" in the select screen select 1 (corresponding to the select screen 2-2). However, the test of the application 5 based on the selector condition of "yes" in the select screen select 1 (corresponding to the select screen 2-1) executed by the guest OS 33 (#1) and the test of the application 5 based on the selector condition of "no" in the select screen select 1 (corresponding to the select screen 2-2) executed by the clone guest OS 33 (#2) may be sequentially (or separately) executed.

The first test case CASE 1 is one of combined test conditions. The first test case CASE 1 is obtained by the operator's selecting "yes" (i.e., the selector 4111) on the first select screen select 1, "yes" on the second select screen select 2-1, and "yes" on the third select screen select 3-1. The select screen select 2-1 is displayed when the operator has selected "yes" (i.e., 4111) on the first select screen select 1, and other select screens are displayed in a similar manners. The second test case CASE 2 and other test cases are obtained in the same manner as the test case CASE 1.

In this example, since the operator selects the selectors (i.e., the same selectors 4111 indicating "yes" in this example) three times, eight test cases in total, that is, the CASE 1 through CASE 8 may need to be carried out to cover all the test conditions. However, since the VMM 1 monitors the condition selecting request for selecting one of the selectors 4111 (yes) and 4112 (no) transmitted from the host OS 31 to the guest OS 33, all the test conditions of the application 5 operating on the guest OS 33 may be executed; that is, all the test conditions of the application 5 may be covered. Accordingly, test reliability and test efficiency of the application 5 may be improved.

Further, according to the embodiments, when the condition selecting request is transmitted from the guest OS 33, the clone of the guest OS 33 is generated so that the test of the application 5 based on one test condition is executed by the clone of the guest OS 33 in parallel with the execution of the test of the application 5 based on the other test condition by the (original) guest OS 33. Accordingly, the test of the application 5 may not be repeated from the beginning (i.e., a first test condition represented by the first select screen "select 1") for every test case. Thus, a time of the test of the application 5 may be largely reduced. However, if the application 5 includes bugs that may merely be generated in the first startup operation, the clone of the guest OS 33 may be generated before completing the test of the application 5 based on the selected first test condition. In this case, the test of the application 5 based on the first test condition may be repeated. Thus, the bugs merely generated in the first startup operation may be easily detected. Accordingly, test reliability and test efficiency of the application 5 may be improved.

The method for testing an application in the virtual computer system according to the embodiment includes generating, on receiving a test condition selecting request to select conditions of a test, a clone of a first virtual machine, and executing selected conditions of the test by the first virtual machine and the generated clone virtual machine. Accordingly, even if the number of the test cases is increased due to the increase in the number of test conditions, the test of the application may not be repeated from the first condition for every test case. That is, the operator may not need to select all of the test conditions. As a result, a portion of time corresponding to the operator's selecting the test conditions may be reduced, the missing out of the test conditions may be prevented, and the reliability of the test of the application may be increased. Thus, the test of the application may be efficiently carried out.

Since the test program of testing an application in the virtual computer system according to the embodiment and a recording medium including the test program may be capable of implementing the aforementioned method for testing the application the virtual computer system, the above-described effects may be obtained.

Further, since the virtual computer system according to the embodiment may be capable of implementing the method for testing an application in the virtual computer system, the above-described effects may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A method of testing an application in a virtual computer system, comprising:
   determining whether there is a sufficient resource to create a clone and waiting for a lapse of a predetermined time period when the determining indicates sufficient resource does not exist;
   selecting, when the determining indicates sufficient resource, one of first and second conditions of a test case of the application from a first virtual machine that executes a test of the application to a second virtual machine that controls the virtual computer system via a virtual computer monitor, wherein the virtual computer system includes hardware including a processor and a memory, the first and second virtual machines respectively having a program operating on the processor, and the virtual computer monitor configured to control the first and second virtual machines;
   generating a clone of the first virtual machine by the virtual computer monitor, when the virtual computer monitor receives selecting of the one of the first and second conditions of the test case of the application; and
   executing the test of the application in the first virtual machine based on the first condition selected by the second virtual machine, and executing the test of the application in the generated clone of the first virtual machine based on the second condition selected by the second virtual machine, and
   wherein the first virtual machine detects a selection by the second virtual machine to correspondingly select a test condition as the second virtual machine, and the test case being selected is determined to have an untested status.

2. The method as claimed in claim 1, further comprising:
   transmitting requests to execute input-output instructions corresponding to the first and second conditions of the test of the application from the first virtual machine and the generated clone of the first virtual machine, via the virtual computer monitor, to a third virtual machine configured to execute the input-output instructions such that the first virtual machine executes the test of the application based on the first condition while the generated clone of the first virtual machine executes the test of the application based on the second condition.

3. The method as claimed in claim 2, comprising:
   trapping by, the virtual computer monitor, the input-output instructions corresponding to the first and second conditions of the test of the application from the first virtual machine and the generated clone of the first virtual machine to the third virtual machine, and
   where the selecting is implemented, when the second virtual machine receives the trapped input-output instructions, and the second virtual machine determines that the memory of the virtual computer system includes a region having a capacity sufficient to accommodate the clone of the first virtual machine.

4. The method as claimed in claim 3, wherein the generating generates the clone of the first virtual machine when the virtual computer monitor receives a request to generate the clone of the first virtual machine from the second virtual machine.

5. A computer readable, non-transitory medium having stored therein a program for causing a processor of a virtual computer system to execute a process for testing an application, the process comprising:
   determining whether there is a sufficient resource to create a clone and waiting for a lapse of a predetermined time period when the determining indicates sufficient resource does not exist;
   selecting, when the determining indicates sufficient resource, one of first and second conditions of a test case of the application from a first virtual machine that executes a test of the application to a second virtual machine that controls the virtual computer system, via a virtual computer monitor, wherein the virtual computer system includes hardware including the processor and a memory, the first and second virtual machines respectively having a program operating on the processor, and the virtual computer monitor configured to control the first and second virtual machines;
   generating a clone of the first virtual machine by the virtual computer monitor, when the virtual computer monitor receives the selecting of the one of the first and second conditions of the test of the application; and
   executing the test of the application in the first virtual machine based on the first condition selected by the second virtual machine, and executing the test of the application in the generated clone of the first virtual machine based on the second condition selected by the second virtual machine, and
   wherein the first virtual machine detects a selection by the second virtual machine to correspondingly select a test condition as the second virtual machine, and the test case being selected is determined to have an untested status.

6. A virtual computer system comprising: hardware including a processor and a memory;
   a first virtual machine having a program operating on the processor and configured to execute a test of an application;
   a second virtual machine having a program operating on the processor and configured to control the virtual computer system;
   a virtual computer monitor configured to control the first and second virtual machines; and
   a clone generator device provided in the virtual computer monitor and configured to generate a clone of the first virtual machine,
   wherein determination of whether there is a sufficient resource to create the clone is implemented and the system waits a lapse of a predetermined time period when the determination indicates sufficient resource does not exist;
   when the determination indicates sufficient resource, one of first and second conditions of a test case of the application is selected from the first virtual machine that executes a test of the application to the second virtual machine,
   the clone generator device generates the clone of the first virtual machine when the first virtual computer monitor transmits a request to select one of first and second conditions of the test case of the application, and
   wherein the first virtual machine executes the test of the application based on the first condition selected by the second virtual machine, and the generated clone of the first virtual machine executes the test of the application based on the second condition selected by the second virtual machine, and
   the test case being selected is determined to have an untested status.

7. The computer readable, non-transitory medium as claimed in claim 5, wherein the process further comprises:
   transmitting requests to execute input-output instructions corresponding to the first and second conditions of the test of the application from the first virtual machine and the generated clone of the first virtual machine, via the virtual computer monitor, to a third virtual machine configured to execute the input-output instructions such that the first virtual machine executes the test of the application based on the first condition while the generated clone of the first virtual machine executes the test of the application based on the second condition.

8. The computer readable, non-transitory medium as claimed in claim 7, wherein the process further comprises:
   trapping, by the virtual computer monitor, the input-output instructions corresponding to the first and second conditions of the test of the application from the first virtual machine and the generated clone of the first virtual machine to the third virtual machine, and transmitting the trapped input-output instructions to the second virtual machine, and
   where selection of the test case of the application is implemented when the second virtual machine receives the trapped input-output instructions, and when the second virtual machine determines that the memory of the virtual computer system includes a region having a capacity sufficient to accommodate the clone of the first virtual machine.

9. The computer readable, non-transitory medium as claimed in claim 8, wherein the generating generates the clone of the first virtual machine when the virtual computer monitor receives a request to generate the clone of the first virtual machine from the second virtual machine.

10. The virtual computer system as claimed in claim 6, wherein the first virtual machine and the generated clone of the first virtual machine transmit requests to execute input-output instructions corresponding to the first and second conditions of the test of the application, via the virtual computer monitor, to a third virtual machine configured to execute the input-output instructions such that the first virtual machine executes the test of the application based on the first condition while the generated clone of the first virtual machine executes the test of the application based on the second condition.

11. The virtual computer system as claimed in claim 10, wherein
   the virtual computer monitor traps the input-output instructions corresponding to the first and second conditions of the test of the application from the first virtual machine and the generated clone of the first virtual machine to the third virtual machine, and transmits the trapped input-output instructions to the second virtual machine, and where selection of the test case of the application is implemented when the second virtual machine receives the trapped input-output instructions, and when the second virtual machine determines that the memory of the virtual computer system includes a region having a capacity sufficient to accommodate the clone of the first virtual machine.

12. The virtual computer system as claimed in claim 11, wherein the clone generator device generates the clone of the first virtual machine when the virtual computer monitor receives a request to generate the clone of the first virtual machine from the second virtual machine.

* * * * *